(12) United States Patent
Peach et al.

(10) Patent No.: US 11,745,916 B2
(45) Date of Patent: Sep. 5, 2023

(54) REUSABLE DELIVERY CONTAINER

(71) Applicant: Walmart Apollo, LLC, Bentonville, AR (US)

(72) Inventors: Corey L. Peach, Bella Vista, AR (US); Craig J. Stevens, Bentonville, AR (US); Christian J. Munoz, Ontario, CA (US); Michael R. Walden, Bentonville, AR (US); Steven A. Welch, Bentonville, AR (US); Elizabeth Enzor, Livermore, CA (US); Whitney Porter, Centerton, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 240 days.

(21) Appl. No.: 16/870,694

(22) Filed: May 8, 2020

(65) Prior Publication Data

US 2020/0270018 A1 Aug. 27, 2020

Related U.S. Application Data

(63) Continuation of application No. 15/647,462, filed on Jul. 12, 2017, now Pat. No. 10,723,509.

(Continued)

(51) Int. Cl.
*B65D 25/06* (2006.01)
*B65D 19/06* (2006.01)
(Continued)

(52) U.S. Cl.
CPC ............... *B65D 19/06* (2013.01); *B65D 5/48* (2013.01); *B65D 21/0233* (2013.01);
(Continued)

(58) Field of Classification Search
CPC ................ B65D 19/06; B65D 21/0233; B65D 21/0234; B65D 21/062; B65D 5/48; B65D 25/06
(Continued)

(56) References Cited

U.S. PATENT DOCUMENTS 2,586,925 A 2/1952 Drengberg
3,113,680 A 12/1963 Frater
(Continued)

FOREIGN PATENT DOCUMENTS

EP 2862818 A1 4/2015
JP 3993482 B2 10/2007
(Continued)

OTHER PUBLICATIONS

A-Lined Handling Systems; "Totes & Containers", http://www.a-lined.com/products/literature/material-handling-equipment/Totes%20&%20Containers.pdf, accessed on May 17, 2016, pp. 15-19.
(Continued)

*Primary Examiner* — John K Fristoe, Jr.
*Assistant Examiner* — Elizabeth J Volz
(74) *Attorney, Agent, or Firm* — Fitch, Even, Tabin & Flannery LLP

(57) ABSTRACT

In some embodiments, apparatuses and methods are provided herein useful for reusable containers and item delivery using reusable containers. In several embodiments, the reusable containers described herein include removable divider walls that can be used to selectively divide an interior of the container into multiple smaller portions. By a further approach, the container and divider walls can have cooperating components to mount the divider wall to the container. In some embodiments, the reusable containers described herein can also include bag handle holding features so that bags placed therein are prevented from spilling contents during transport.

12 Claims, 8 Drawing Sheets

Related U.S. Application Data

(60) Provisional application No. 62/361,187, filed on Jul. 12, 2016.

(51) Int. Cl.
  *B65D 5/48* (2006.01)
  *B65D 21/02* (2006.01)
  *B65D 21/06* (2006.01)

(52) U.S. Cl.
  CPC ....... *B65D 21/0234* (2013.01); *B65D 21/062* (2013.01); *B65D 25/06* (2013.01); *Y02W 30/80* (2015.05)

(58) Field of Classification Search
  USPC ............. 220/1.5, 532, 533, 529, 23.89, 549; 312/234.4; 211/126.7
  See application file for complete search history.

(56) References Cited

U.S. PATENT DOCUMENTS

| | | | |
|---|---|---|---|
| 3,330,529 A | 7/1967 | Hansson | |
| 3,398,840 A | 8/1968 | Wilson | |
| 3,480,178 A | 11/1969 | Morgan | |
| 3,534,866 A | 10/1970 | Asenbauer | |
| 3,651,976 A | 3/1972 | Chadbourne | |
| 4,139,098 A * | 2/1979 | Mollon | B65D 21/045 220/23.6 |
| 4,251,006 A | 2/1981 | Smith | |
| 4,372,444 A | 2/1983 | Le Grand | |
| D274,967 S | 8/1984 | Taylor | |
| 4,593,816 A * | 6/1986 | Langenbeck | B65D 21/0219 206/508 |
| 4,934,636 A | 6/1990 | Orlosky | |
| 4,974,746 A * | 12/1990 | Dickinson | B65F 1/004 209/702 |
| D347,419 S | 5/1994 | Jackson | |
| D395,756 S | 7/1998 | Tanji | |
| D408,631 S | 4/1999 | Dickinson | |
| D409,387 S | 5/1999 | Yemini | |
| 6,039,202 A | 3/2000 | Olstad | |
| 6,666,348 B2 | 12/2003 | Fore | |
| D513,870 S | 1/2006 | Rosine | |
| D596,857 S | 7/2009 | Ahlgrim | |
| D612,608 S | 3/2010 | Snell | |
| 7,708,160 B2 | 5/2010 | Booth | |
| D639,560 S | 6/2011 | Brown | |
| 7,984,820 B2 | 7/2011 | Dancyger | |
| D648,535 S | 11/2011 | Reinhart | |
| 8,960,469 B1 | 2/2015 | Helal | |
| 9,008,828 B2 | 4/2015 | Worsley | |
| D734,611 S | 7/2015 | Baruch | |
| D747,102 S | 1/2016 | Kraemer | |
| 9,676,518 B2 | 6/2017 | Shamp | |
| D794,958 S | 8/2017 | Reinhart | |
| D807,169 S | 1/2018 | Pickard | |
| D811,213 S | 2/2018 | Pickard | |
| D815,835 S | 4/2018 | Levie | |
| D832,115 S | 10/2018 | Fitchett | |
| D832,577 S | 11/2018 | Ogilvie | |
| 10,723,509 B2 * | 7/2020 | Peach | B65D 21/0233 |
| 2005/0115972 A1 | 6/2005 | Osborn | |
| 2006/0201440 A1 | 9/2006 | Phelan | |
| 2006/0254951 A1 | 11/2006 | Yang | |
| 2008/0128428 A1 * | 6/2008 | Beckerman | B65D 25/06 220/532 |
| 2008/0296194 A1 * | 12/2008 | Stahl | B65D 21/045 206/518 |
| 2008/0296308 A1 | 12/2008 | Barbalho | |
| 2009/0178989 A1 | 7/2009 | Accuardi | |
| 2009/0294451 A1 | 12/2009 | Martheenal | |
| 2011/0042334 A1 | 2/2011 | Sucevich | |
| 2012/0043289 A1 | 2/2012 | Brown | |
| 2012/0132558 A1 | 5/2012 | Busch | |
| 2013/0062357 A1 * | 3/2013 | Souza | D06F 95/002 220/676 |
| 2013/0105489 A1 * | 5/2013 | Burgess | D06F 95/002 220/533 |
| 2018/0009101 A1 | 1/2018 | Piccininni | |

FOREIGN PATENT DOCUMENTS

| | | | | |
|---|---|---|---|---|
| WO | 2014074106 | | 5/2014 | |
| WO | 2015107438 | | 7/2015 | |
| WO | WO2015107438 | * | 7/2015 | B65D 25/06 |

OTHER PUBLICATIONS

Auer Packaging; "Storage Boxes SK With Open Front", http://www.auer-packaging.com/en/storage-boxes-sk_149.html, printed Jul. 12, 2016, pp. 1-3.
Buckhorn; "Reusable Packing Solutions"; http://taylormhc.com/wp-content/uMay2016loads/2016/04/Product-Catalog.pdf>; printed Sep. 11, 2017; pp. 26-27.
Caterbox UK Ltd; "Glass Racks", https://www.caterbox.co.uk/glass-racks, printed Jul. 12, 2016, pp. 1-2.
Global Industrial; "Stack & Nest Shipping, Conveyor Totes", http://www.globalindustrial.com/g/storage/bins-totes-containers/shipping-security/stack-nest-shipping-totes, accessed on May 17, 2016, pp. 1-3.
PackageWarehouse; "Plastic Bin Dividers", http://packagewarehouse.com/plastic-bins/storage-containers/plastic-bin-dividers/, printed Jul. 12, 2016, pp. 1-5.
PCT; App. No. PCT/US2017/00688; International Search Report and Written Opinion dated Oct. 30, 2017.
PCT; App. No. PCT/US2017/041678; International Search Report and Written Opinion dated Sep. 13, 2017.
Solent Plastics; "Open Fronted Plastic Boxes & Bins", http://www.solentplastics.co.uk/order-picking-containers-open-fronted-storage/open-fronted-boxes-bins/, printed Jul. 13, 2016, pp. 1-5.
UPSTO; U.S. Appl. No. 15/647,462; Office Action dated Feb. 19, 2019 (pp. 1-12).
USPTO; U.S. Appl. No. 15/644,161; Office Action dated Mar. 24, 2020 (pp. 1-17).
USPTO; U.S. Appl. No. 15/644,161; Office Action dated Apr. 16, 2019.
USPTO; U.S. Appl. No. 15/644,161; Office Action dated Sep. 13, 2019 (16 pages).
USPTO; U.S. Appl. No. 15/644,161; Office Action dated Oct. 2, 2018 (pp. 1-15).
USPTO; U.S. Appl. No. 15/647,462; Notice of Allowance dated Jan. 30, 2020 (pp. 1-9).
USPTO; U.S. Appl. No. 29/599,435; Office Action dated Apr. 2, 2020 (pp. 1-7).
USPTO; U.S. Appl. No. 29/599,435; Office Action dated May 13, 2019.

* cited by examiner

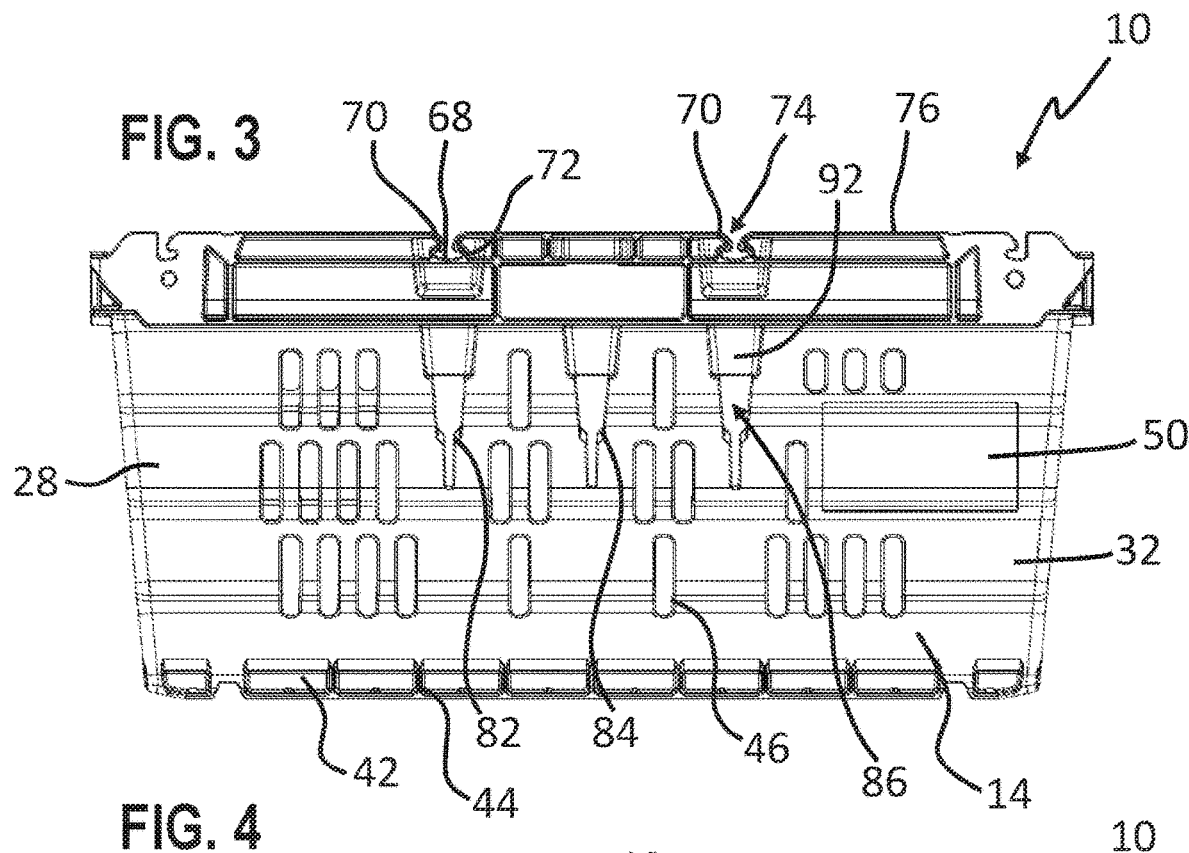

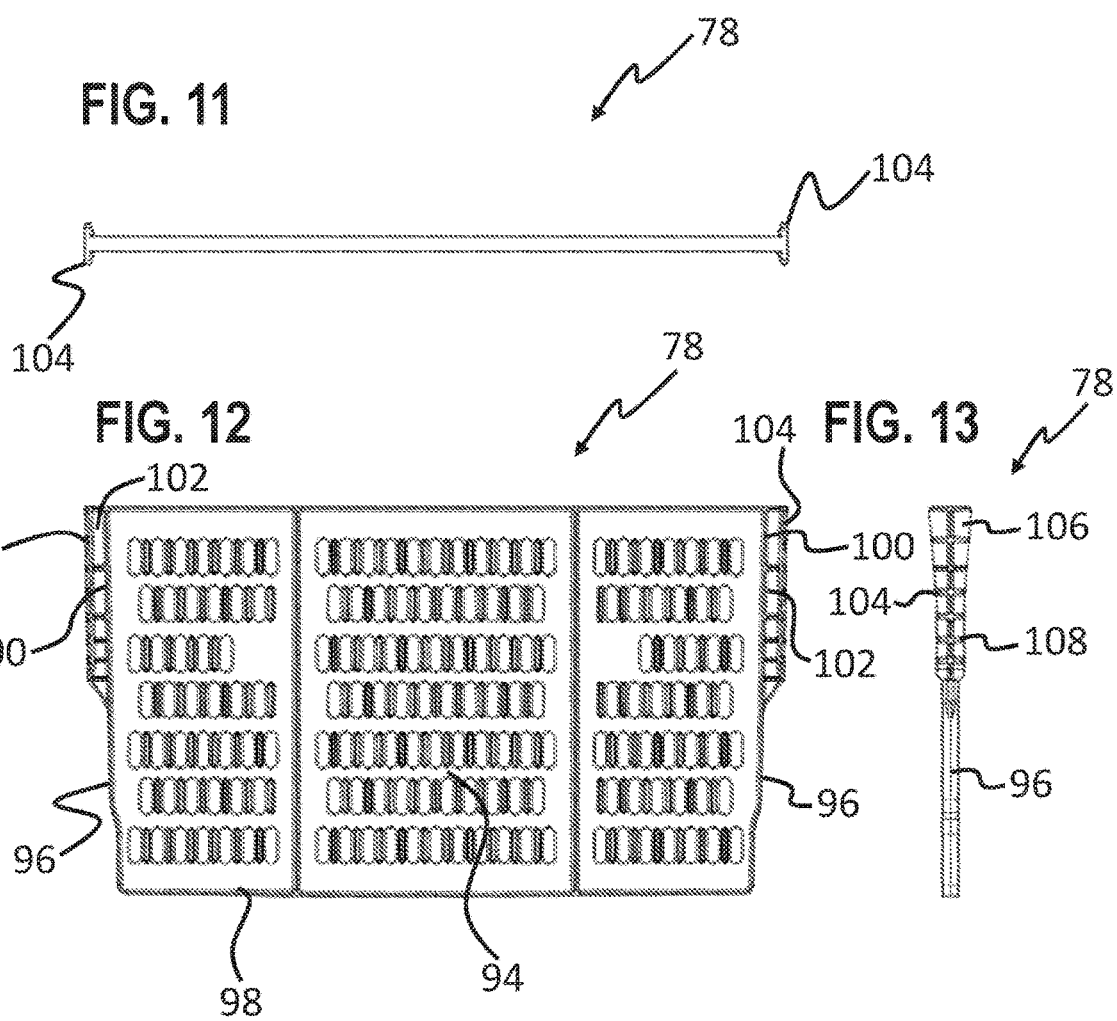

REUSABLE DELIVERY CONTAINER

CROSS-REFERENCE TO RELATED APPLICATION

This application is a continuation of U.S. application Ser. No. 15/647,462, filed Jul. 12, 2017, which claims the benefit of U.S. Provisional Application No. 62/361,187, filed Jul. 12, 2016, all of which are incorporated herein by reference in their entireties.

TECHNICAL FIELD

This invention relates generally to containers and, more particularly, to reusable containers.

BACKGROUND

Delivering items to a location of a customer can utilize a variety of containers. By some approaches, individual items can be packaged in single-use containers, such as cardboard boxes or the like. Single-use containers, however, can be wasteful. Additionally, delivery containers can be subjected to rough handling and various conveyor systems during use.

BRIEF DESCRIPTION OF THE DRAWINGS

Disclosed herein are embodiments of systems, apparatuses and methods pertaining to a reusable container that can be used for the delivery of items. This description includes drawings, wherein:

FIG. 3 is a front elevational view of the reusable container of FIG. 1 in accordance with some embodiments.

FIG. 4 is a side elevational view of the reusable container of FIG. 1 in accordance with several embodiments.

FIG. 11 is a top plan view of one of the divider walls mounted in the interior of the reusable container of FIG. 9 in accordance with some embodiments.

FIG. 12 is a front elevational view of the divider wall of FIG. 11 in accordance with several embodiments.

FIG. 13 is a side elevational view of the divider wall of FIG. 11 in accordance with some embodiments.

Figure 1:
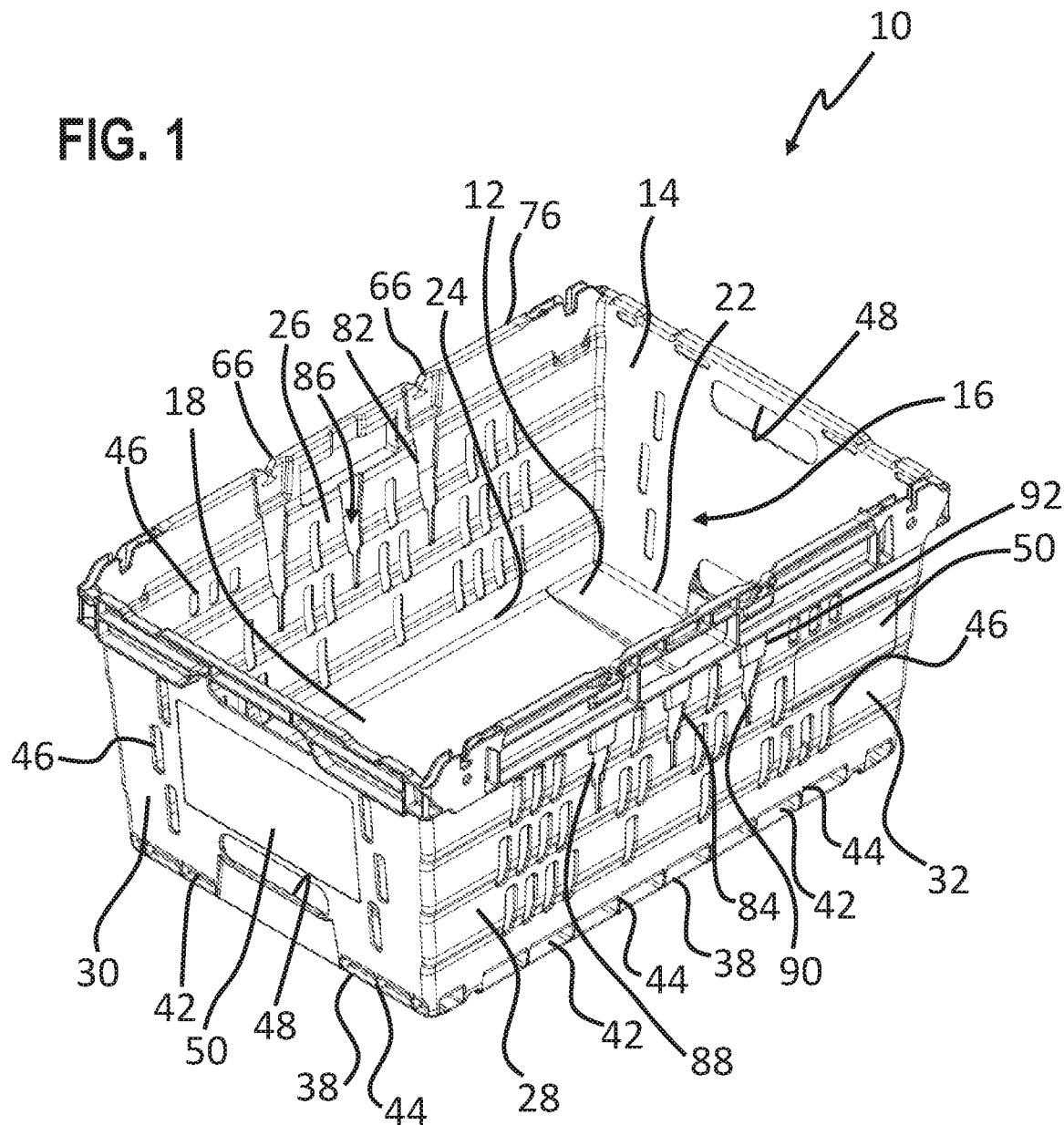
FIG. 1 is a top perspective view of a reusable container in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for reusable containers and item delivery using reusable containers. In some embodiments, the reusable containers described herein include removable divider walls that can be used to selectively divide an interior of the container into multiple smaller portions. By a further approach, the container and divider walls can have cooperating components to mount the divider wall to the container. If desired, the container can be configured so that the divider walls can be positioned at thirds and/or half of the container. In several embodiments, the reusable containers described herein can also include bag handle holding features so that bags placed therein are prevented from spilling contents during transport. In some embodiments, the reusable containers described herein can also include bottom surface portions configured to engage pop-up rollers and/or conveyor belts.

Reusable containers 10 having some or all of these features are shown in FIG. 1-13. By some approaches, the container 10 can be of a rigid plastic material, so as to be reusable and resilient to aid in the delivery of items. The container 10 includes a bottom wall portion 12 and a sidewall portion 14, which can be integral with one another and that together define an interior 16 of the container 10. The bottom wall 12 includes upper and lower surfaces 18, 20, end edges 22, and side edges 24. The bottom wall 12 can be preferably configured so deflect less than 10 mm during use, and preferably less than 7 mm. The sidewall 14 includes inner and outer surfaces 26, 28, end portions 30 that extend upwardly from the bottom wall end edges 22 and side portions 32 that extend upwardly from the bottom wall side edges 24.

In some embodiments, the bottom wall upper surface 18 can be substantially planar, including only variances, ridges, or the like of 4 mm or less, and preferably about 2 mm or less. An example substantially planar bottom wall upper surface is shown in the cross-section of FIG. 7. In the illustrated form, the bottom wall upper surface 18 has a 1.5 mm ridge therein.

Figure 2:
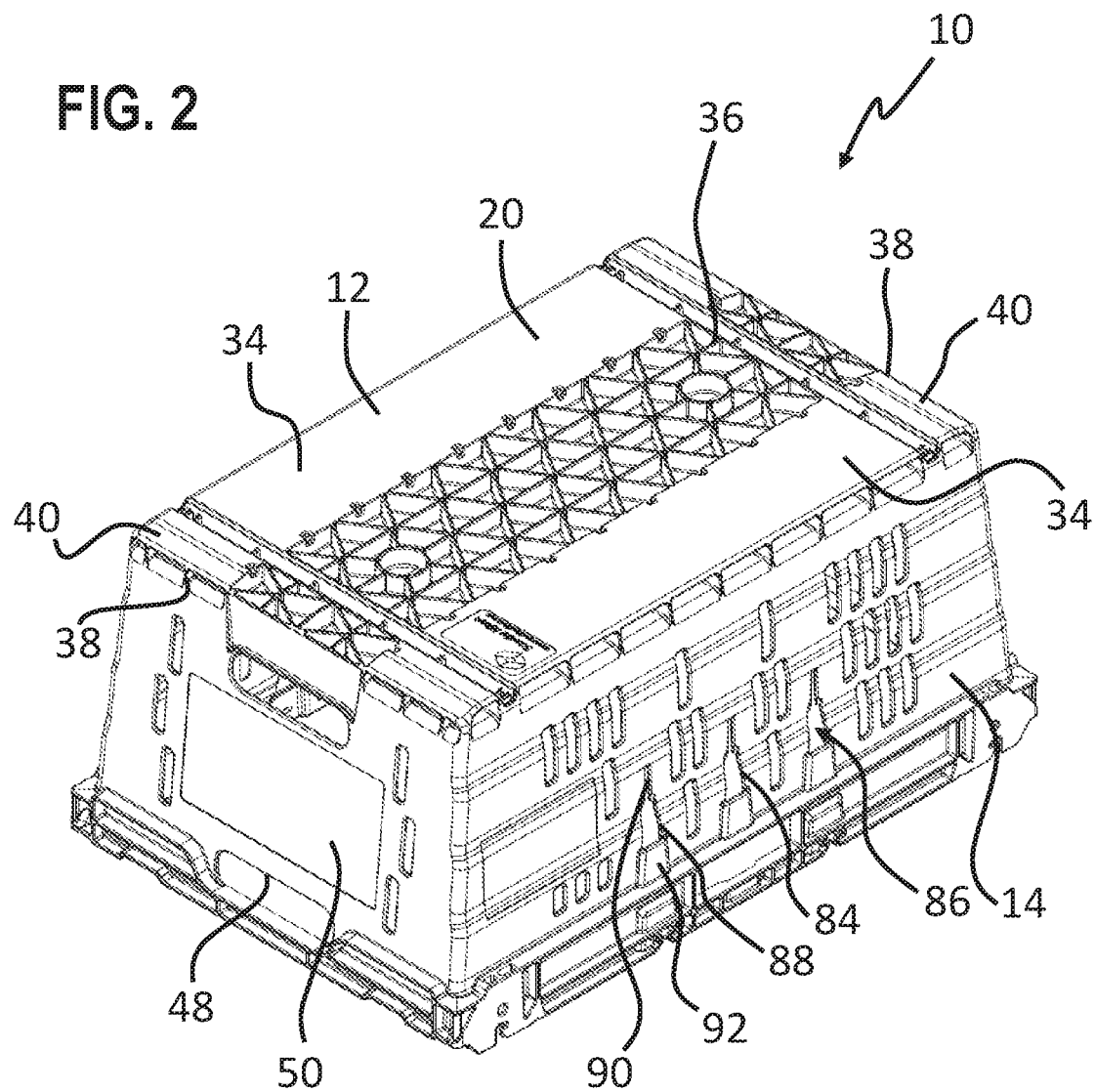
FIG. 2 is a bottom perspective view of the reusable container of FIG. 1 in accordance with several embodiments.
Figure 5:
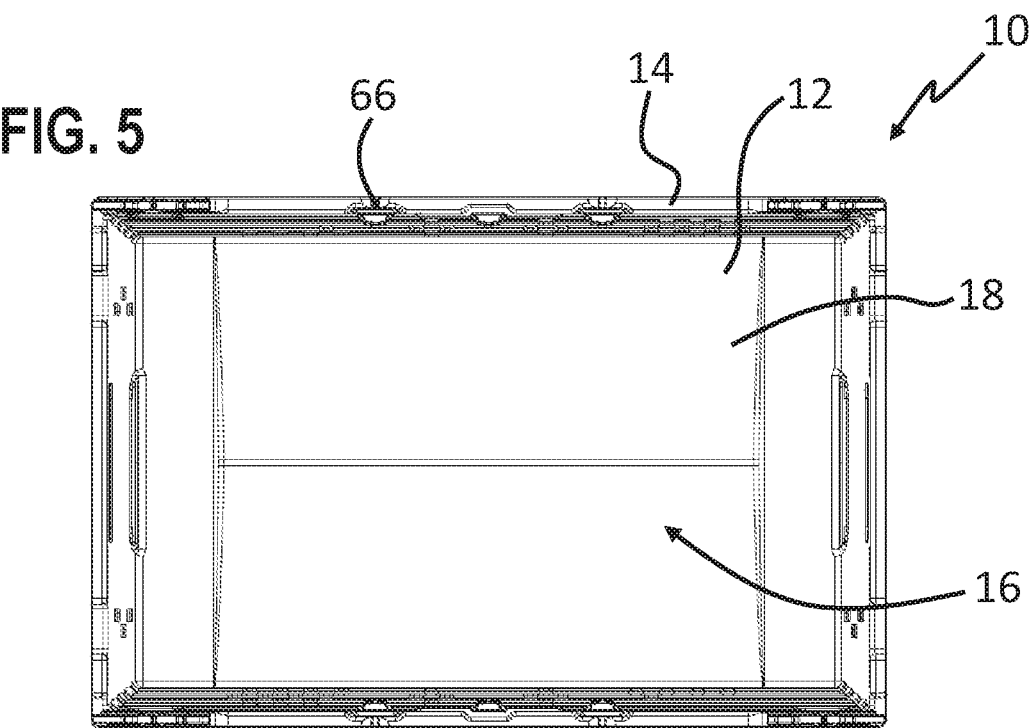
FIG. 5 is a top plan view of the reusable container of FIG. 1 in accordance with some embodiments.
Figure 6:
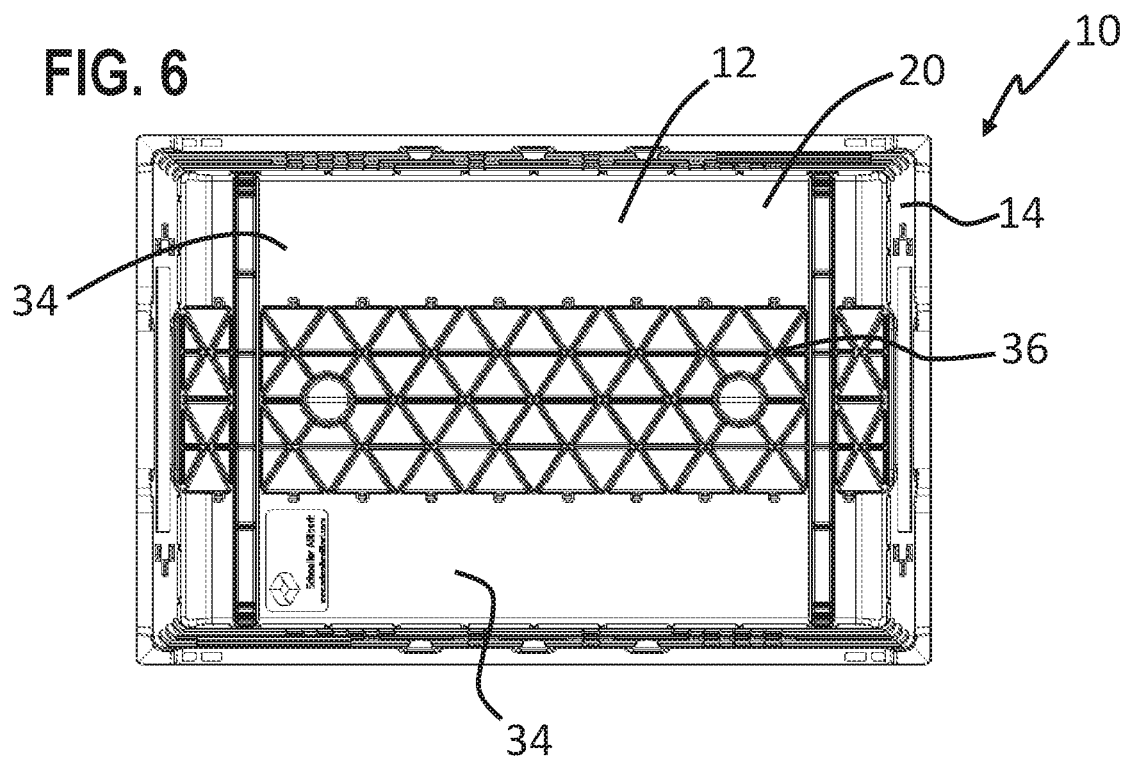
FIG. 6 is a bottom plan view of the reusable container of FIG. 1 in accordance with several embodiments.
Figure 7:
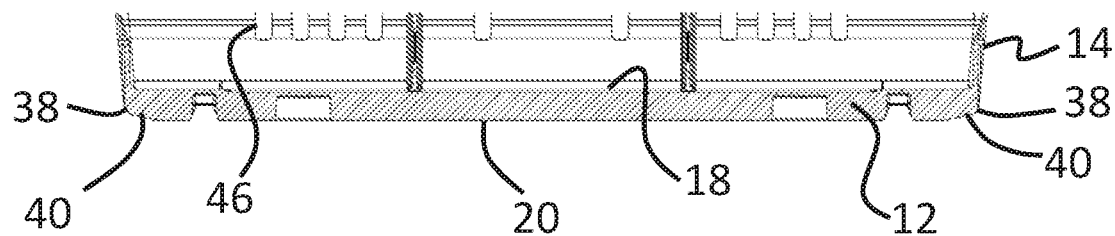
FIG. 7 is a cross-sectional view of a portion of the reusable container of FIG. 1 in accordance with some embodiments.

Features of the bottom wall lower surface 20 are shown in FIGS. 2 and 6. During handling, the container 10 can be conveyed and transported over various surfaces. For example, the container 10 may be conveyed by pop-up rollers during use. To engage the rollers, the lower surface 20 can include one or more solid, substantially planar portions 34 extending along a majority of a length thereof extending between the end edges 22 and/or a width thereof extending between the side edges 24. In the form shown in FIG. 6, the lower surface 20 includes substantially planar portions 34 that extend along the majority of both the length and width thereof. More specifically, as shown, the substantially planar portions 34 include portions disposed along both the side edges 24 and end edges 22 of the lower surface.

In another example, the container 10 may be conveyed on one or more conveyors, such as conveyor belts, rollers, and transfers. In order to grip these conveyors, the lower surface 20 can also include patterned portions 36. The patterned portions 36 can be surface features or ridges, or can be edges of upstanding walls extending within the bottom wall 12. Further, as shown, the patterned portions 36 can extend along a majority of the length of the lower surface 20. If desired, the patterned portions 36 can be disposed between the substantially planar portions 34 along the length direction. In the illustrated form, the patterned portions 36 include an array of triangles. Of course, other designs and configurations, such as rectangles, circles, or combinations of shapes, can also be utilized.

As discussed above, the container 10 described herein can be disposed on different types of conveyors and can transfer from one conveyor to another. The bottom wall 12 can be configured to ease the transfer between conveyors. By one approach, corners 38 of the bottom wall 12 can be rounded so as to avoid catching on the various parts of the conveyors. In one example, the corners 38 can have a radius of between about 3 mm and about 10 mm, and more preferably about 6 mm.

Moreover, the bottom wall lower surface 20 can include upwardly tapering end portions 40 that extend along the end edges 22 thereof. The upwardly tapering end portions 40 can extend upwardly at an angle with respect to horizontal of between about 5 degrees and about 30 degrees, preferably about 10 degrees and about 20 degrees, and more preferably about 12 degrees. Further, the upwardly tapering portions 40 can extend along the length of the bottom wall lower surface 20 between the end edges 22 thereof between about 5 mm and about 50 mm, preferably between about 15 mm and about 30 mm, and more preferably about 22 mm. Of course, if desired, the lower surface 20 could alternatively or also include upwardly tapered side portions.

Additionally, as shown in FIGS. 3 and 4, the bottom wall 12 can include hollow portions 42 disposed between the upper and lower surfaces 18, 20 thereof. The hollow portions 42 can aid in cooling the container 10 after formation so that the bottom wall 12 maintains a desired configuration and appearance. The bottom wall 12 can further include reinforcing walls 44 extending between the upper and lower surfaces 18, 20 thereof to strengthen the bottom wall 12 against deformation during use. The reinforcing walls 44 can be disposed in any desired pattern, such as the triangular array shown.

By some approaches and as shown in FIGS. 3 and 4, the sidewall 14 can taper outwardly as it extends upwardly from the bottom wall 12. So configured, the container 10 can nest together in a stack of similarly configured containers for storage purposes. In one form, the bottom wall 12 and sidewall 14 can be configured so that the container 10 can nest at least about 50% of its height into another container, more preferably more than 70% of its height, and even more preferably about 80% of its height.

In order to lower the weight of the container 10, and use less material for the container 10, the sidewall 14 can include a plurality of openings 46 extending therethrough. The openings 46 enable air flow through the container interior 16. If desired, the openings 46 can have a height that less than half, and preferably less than a third, of a height of the sidewall 14. So configured, the sidewall 14 can maintain structural connections around the relatively smaller openings. The sidewall 14 can also include handle openings 48 disposed on the end portions 30 and/or side portions 32 thereof.

The openings 46 and handle openings 48 can also be configured to minimize spillage from within the container 10. More specifically, lowest ones of the openings 46 and/or handle openings 48 can be spaced from the bottom wall upper surface 18 by an amount to contain a predetermined amount of any liquids spilled within the container 10. In one example, the openings 46 and/or handle openings 48 can be spaced from the bottom wall upper surface 18 by at least 10% of a height of the sidewall 14. In another example, the openings 46 and/or handle openings 48 can be spaced from the upper surface 18 by between about 10 mm and about 50 mm, preferably between about 20 mm and about 40 mm, and more preferably about 30 mm.

Figure 8:
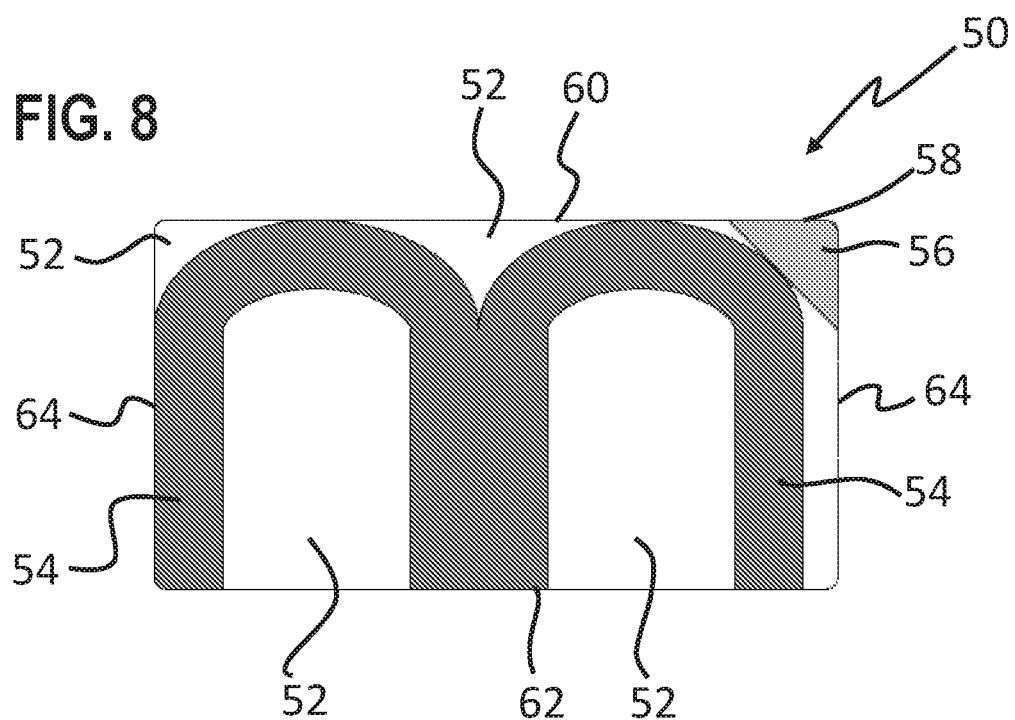
FIG. 8 is a front elevational view of a label area for a reusable container in accordance with several embodiments.
Figure 9:
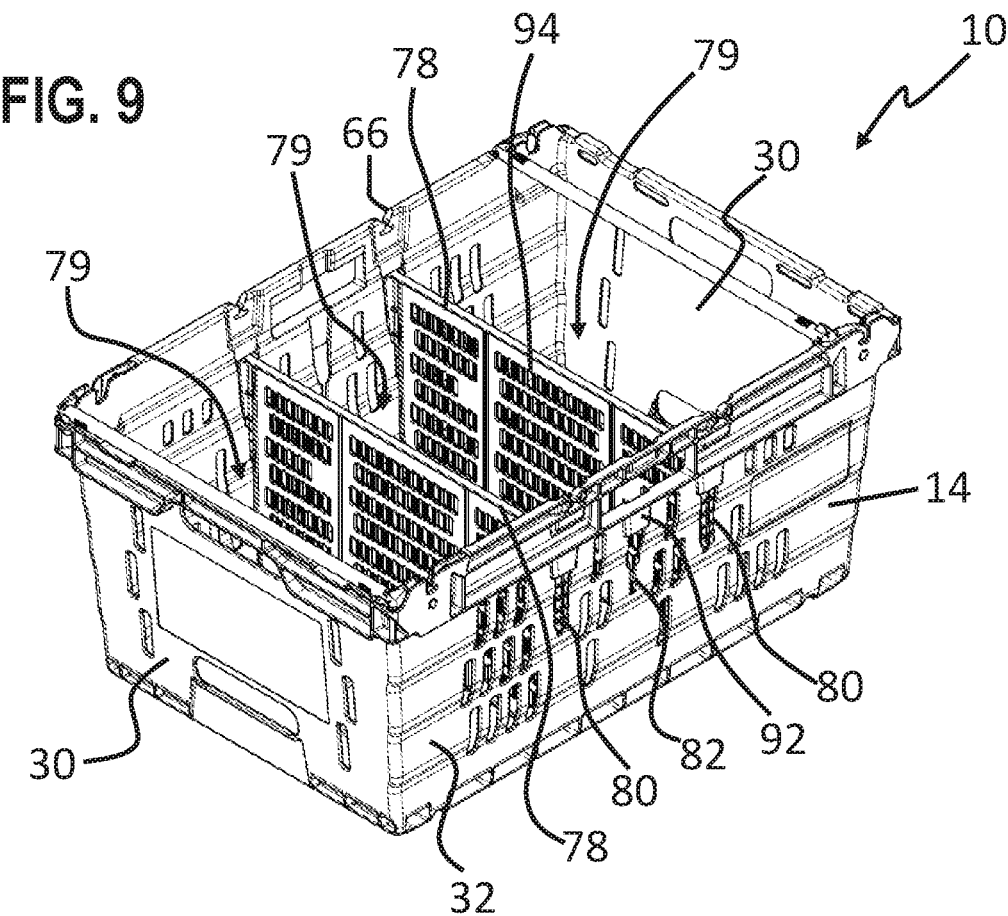
FIG. 9 is a top perspective view of a reusable container having removable divider walls mounted in an interior thereof in accordance with some embodiments.

As shown in FIGS. 3, 4, and 8, the sidewall 14 can also include one or more label areas 50 on the outer surface 28 thereof. Each of the label areas 50 can be configured so a label adheres to different portions thereof with different adhesive strengths, which enables easy removal of the label while also ensuring that the label stays affixed during use of the container 10. In one form, the label area 50 can include one or more smooth portions 52 configured to allow a label adhesive to fully adhere thereto and one or more heavily roughened or textured portions 56 configured to prevent a label adhesive to adhere thereto or minimize adherence thereto such that the portion of the label applied to the heavily textured portion 56 can be pulled away from the label area 50 with little or no effort needed to overcome an adhesive force. In a further form, the label area 50 can include one or more lightly roughened or textured portions 54 configured to allow a label adhesive to partially adhere thereto. In other words, the smooth portions 52 can have a first level of adherence of an adhesive label thereto, the lightly textured portion 54 can have a third level of adherence of the adhesive label thereto, and the heavily textured portion 56 can have a second level of adherence of the adhesive label thereto, where the first level of adherence is relatively stronger than the second and third levels of adherence and the third level of adherence is relatively stronger than the second level of adherence.

In the illustrated form, the heavily textured portion 56 of the label area 50 is disposed in a corner 58 thereof to provide a convenient gripping area for a user when removal of a label is desired. Further, the lightly textured portions 54 can be disposed in a pattern to distribute the relatively lower adhesion across a majority, or entirety, of a width and height of the label. For example, as shown, the lightly textured portion 54 can intersect one or more of top, bottom, or side edges 60, 62, 64 of the label area 50. In the illustrated form, the lightly textured portion 54 is disposed in an m shape. Further, the heavily textured portion 56 can be disposed in multiple corners 58 and/or along one or more of the edges 60, 62, 64.

The sidewall 14 can further include one or more pairs of bag handle holders 66, as shown in FIGS. 1 and 3. The handle holders 66 are configured to retain the handles of bags therein during transport of the container 10 so that the bags remain in an open, upright orientation and do not spill their contents. Further, because the bags can be held in an open configuration, a user can easily determine how much free space a bag has and can easily identify items in the bag.

By one approach, the handle holders 66 include a notch or depression 68 in the sidewall 14 and one or more retaining arms 70 that project over an open top 72 of the notch 68. The retaining arms 70 define an opening 74 therebetween so that the handles of the bag are retained within the notch 68 until they are lifted upwardly through the opening 74. This minimizes the handles becoming inadvertently dislodged during transport. By one approach, the handle holders 66 are disposed in a top edge 76 of the sidewall 14.

As shown in FIGS. 1-3 and 9-13, the container 10 can further be configured to include one or more divider walls 78. The divider walls 78 are configured to mount to the sidewall 14 to divide the container interior 16 into multiple smaller portions 79. By some approaches, the divider walls 78 can include outwardly projecting portions 80 configured to mount to slots 82 in the sidewall 14, as described below.

Details of the slots 82 are shown in FIGS. 1-3. The slots 82 are provided in pairs that align with one another across the container interior 16. The slots 82 are configured to guide the divider wall 78 to a locked position as the divider wall 78 is mounted to the sidewall 14. The locked position can restrict the divider wall 78 from lateral movement within the container interior 16.

Each slot 82 includes edges 84 that define an opening 86 through the sidewall 14 with a top portion 88 and a bottom portion 90. The edges 84 within the top portion 88 can be relatively wider than the outwardly projecting portions 80 of the divider wall 78 so that the divider wall 78 can be easily oriented and mounted therein. The edges 84 can be downwardly tapering so that the opening 86 is relatively larger at the top thereof and relatively smaller at the bottom thereof, which guides the outwardly projecting portions 80 of the divider wall 78 as the divider wall 78 is shifted downwardly. The edges 84 of the bottom portion 90 of the opening 86 extend generally parallel to one another and are spaced closely together so that the bottom portion 90 has a relatively narrow width as compared to the top portion 88.

Figure 10:
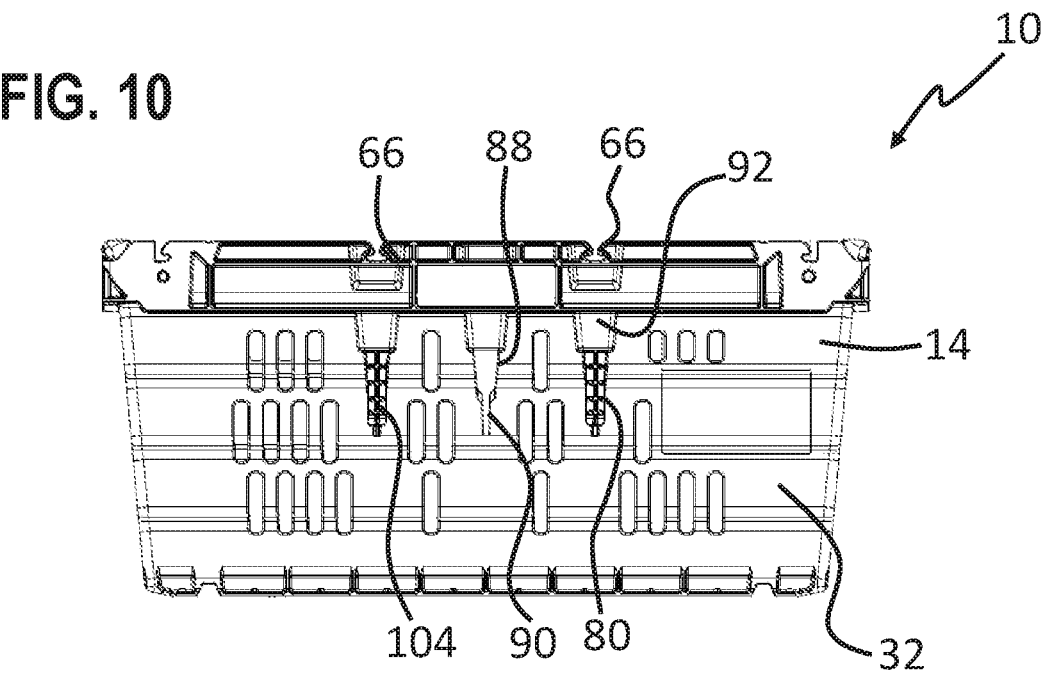
FIG. 10 is a front elevational view of the reusable container of FIG. 9 in accordance with several embodiments.
Figure 14:
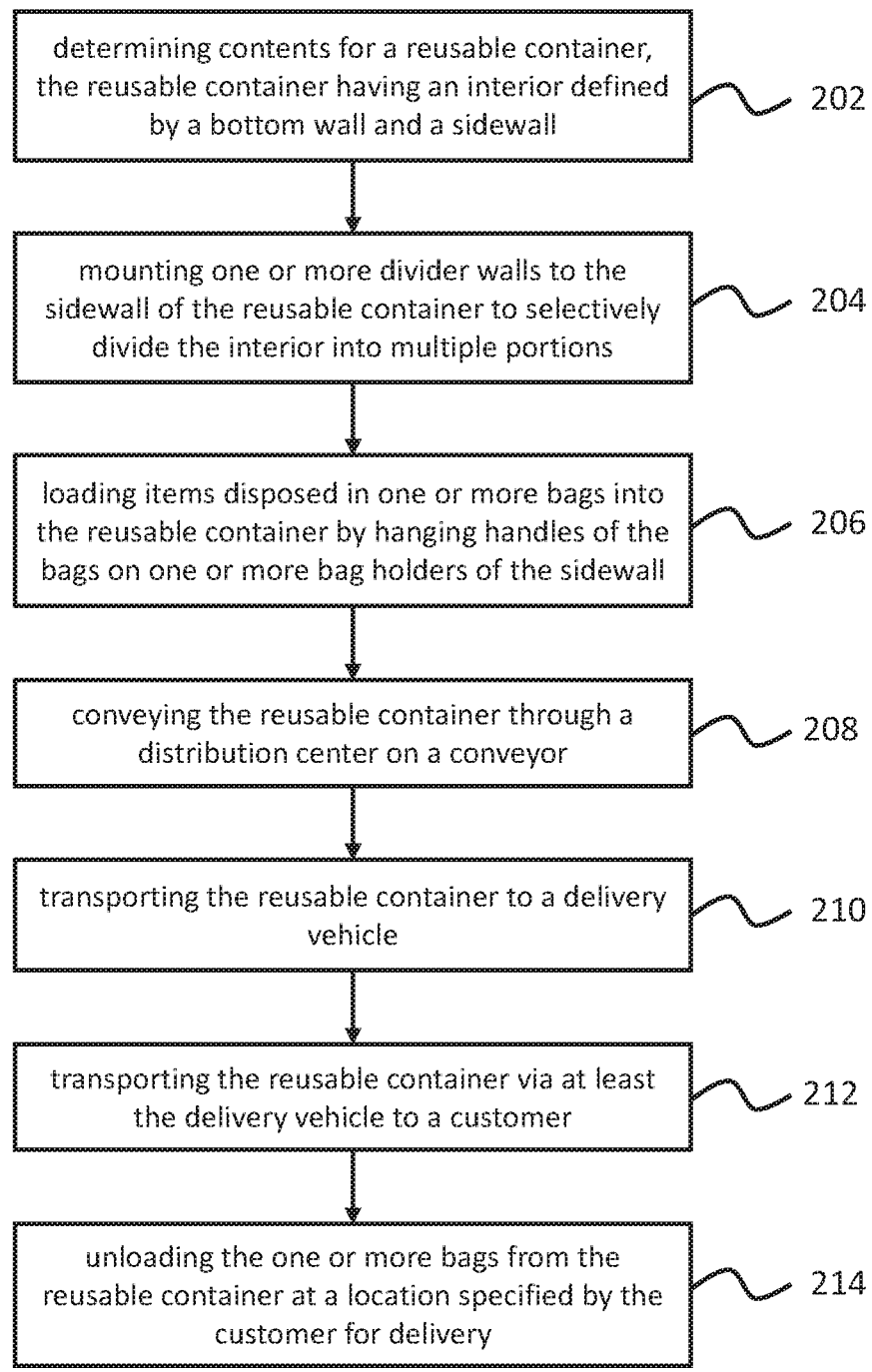
FIG. 14 is a flowchart in accordance with several embodiments.

If desired, the sidewall 14 can include a stop or shield portion 92 disposed on the outer surface 28 thereof. The stop portion 92 can be disposed outwardly of the opening 86 and cap the top portion 88 thereof to thereby provide a stop for the outwardly projecting portion 80 of the divider wall 78. As shown in FIG. 10, the stop portion 92 is configured to enclose a top of the divider wall outwardly projecting portion 80 when the divider wall 78 is mounted to the sidewall 14.

Details of an example divider wall 78 are shown in FIGS. 9-13. As shown, the divider wall 78 includes a main body portion 94 with side edges 96 configured to generally extend along the sidewall 14 of the container 10 and a bottom edge 98 configured to generally extend along the bottom wall 12 of the container 10 when the divider wall 78 is mounted within the container 10. As set forth above, the divider wall 78 further includes outwardly projecting portions 80 that extend laterally away from the side edges 96 of the main body portion 94 along a top portion 100 thereof.

The outwardly projecting portions 80 include a neck portion 102 that extends laterally away from the side edge 96 of the main body portion 94 and a transverse panel portion 104 disposed outwardly of the neck portion 102. The panel portion 104 extends generally transverse to the lateral direction of the neck portion 102 to form a T shape therewith. So configured, the divider wall 78 can mount within the slot 82 by sliding the neck portion 102 thereof into the opening 86 so that the panel portion 104 is at least partially disposed outwardly of the sidewall outer surface 28.

As discussed above, the sidewall 14 can be configured to taper outwardly as it extends upwardly away from the bottom wall 12. So configured, the divider wall 78 is mounting to a wall that is angled outwardly with respect to vertical. As shown in FIG. 12, by one approach the panel portion 104 can extend generally vertically. So configured, a top portion 106 of the panel portion 104 can be disposed within the opening 86, while a bottom portion 108 thereof is disposed outwardly of the sidewall 14 to extend along the outer surface 28 thereof. With this configuration, the neck portion 102 is utilized to extend through the narrow width bottom portion 90 of the opening 86 so that the sidewall 14 is trapped between the bottom portion 108 of the panel portion 104 and the main body portion 94.

If desired, the panel portion 104 can have a configuration similar to the opening 86 with a downwardly tapering top portion 106 and a relatively narrow width bottom portion 108 and the downwardly tapering top portion 106 of the panel portion 104 can be sized to fit within the top portion 88 of the opening 86. So configured, a user can slide the divider wall 78 vertically into the container 10 aligned with the slots 82 thereof and the top portion 106 of the panel portion 104 will eventually abut the downwardly tapering edges 84 of the opening 86.

By one approach, the container 10 can include pairs of slots 82 disposed at thirds of the length thereof between the sidewall end portions 30 so that when the divider walls 78 are mounted thereto, the divider walls 78 generally divide the container interior 16 into thirds. By a further approach, the container 10 include a pair of slots 82 disposed at half of the length thereof. By a preferred approach, the container can include both options so that a user can selectively divide the container interior 16 into thirds, half, or more, as desired.

In some forms, the handle holders 66 can be aligned above one or more of the slots 82. So configured, when a user hangs a bag therefrom and a divider wall 78 is mounted within the slots 82, the bag will hang against the divider wall 78, on a side of the user's choosing, which in combination prevents the bag from spilling and also restricts lateral swinging of the bag during transport.

The container 10, configured as described herein, is particularly capable for use in transporting goods from a distribution center through a supply chain to a customer. More specifically, when items need to be delivered to a customer, the items commonly must be transported between several different locations and over an array of conveyor mechanisms. Further, the items can be perishable or damageable, so careful handling can be important. After the contents for the container 10 are determined 202, a user can mount or install 204 one or more of the divider walls 78 into the container 10. Thereafter, the user can load 206 the items into the container interior 16, such as by using the handle holders 66 and/or divider walls 78, so that the items are securely held within the container interior 16 and separated and/or held stationary as needed. Thereafter, the container 10 can be loaded onto one or more conveyors and conveyed 208 thereby within a distribution center or the like. Then, a user can transport 210 the container 10 to a delivery vehicle and transport 212 the container with the delivery vehicle to a customer. At the location of the customer, the user can then unload 214 the container 10 to deliver the items to the customer.

In some embodiments, a reusable container for use in transporting goods from a distribution center through a supply chain to a customer is described herein that includes a bottom wall having upper and lower surfaces, side edges, and end edges; a sidewall having side portions extending upwardly from the bottom wall side edges and end portions extending upwardly from the bottom wall end edges, the bottom wall and sidewall defining an interior; multiple pairs of slots in the sidewall side portions, each pair of slots having one slot disposed in each of the sidewall side portions that are aligned with one another across the interior, each slot including an opening extending through the respective sidewall side portion; and one or more removable divider walls, each including a main portion sized to extend between the sidewall side portions and outwardly projecting portions configured to extend through the openings of one of the pair of slots to mount the removable divider wall to the sidewall and selectively divide the interior into multiple interior portions.

In several approaches, the openings of the pair of slots are configured to guide the outwardly projecting portion downwardly as the divider wall is mounted to the sidewall and lock the divider wall against lateral movement.

In further approaches, the openings of the pair of slots can be downwardly tapering with a narrow width bottom portion; and the outwardly projecting portions of the removable divider wall include neck portions and panel portions disposed on the neck portions. The neck portion can be configured to extend through the respective opening and the panel portion can be configured to extend adjacent to an outer surface of the respective sidewall side portion such that the sidewall side portion is disposed between the panel portion and the main portion of the removable divider wall at least adjacent to the narrow width bottom portion of the respective opening.

In further approaches, the multiple pairs of slots can include two pairs of slots disposed along the sidewall side portions to divide the interior into thirds and a pair of slots disposed along the sidewall side portions to divide the interior in half.

In some approaches, the sidewall includes one or more pairs of bag handle holders in the sidewall, where each of the pair of bag handle holders is configured to receive a handle of a bag so that a bag mounted thereto is held in an open configuration within the interior.

In further approaches, the one or more bag handle holder portions are disposed along an upper edge thereof. The bag handle holder portions can include a notch in the upper edge of the sidewall and arm portions extending over portions of the notch to retain handles of bags within the notch.

In further approaches, the bag handle holders, in combination with the one or more divider walls, can be configured to hold bags within the container in a substantially stationary, upright configuration to prevent spillage of loose items.

In several approaches, the bottom wall bottom surface can include solid planar portions extending along a majority of a width thereof between the end edges where the solid planar portions are configured to engage pop-up rollers for conveyance.

In further approaches, the bottom wall can include a patterned portion having a plurality of walls having lowers edges exposed along the bottom wall bottom surface where the patterned portion extends along a majority of the width of the bottom wall between the end edges thereof and is configured to engage conveyors for conveyance.

In some approaches, the bottom wall side and end edges can have a rounded configuration to avoid catching on conveyance mechanisms. In further approaches, the bottom wall bottom surface can include upwardly tapering portions extending along the end edges thereof that are configured to enable smooth conveyor transfer.

In several approaches, the sidewall can include a label area on one or more of the side and end portions thereof. The label area can include a smooth portion configured to have a first level of adherence of an adhesive label thereto and a textured edge portion configured to have a second level of adherence of the adhesive label thereto, where the first level of adherence is relatively stronger than the second level of adherence.

In further approaches, the textured edge portion can be a heavily textured portion, and the label area can further include a lightly textured portion configured to have a third level of adherence of the adhesive label thereto, where the third level of adherence has a strength between the first and second level of adherence.

In some approaches, the sidewall can include one or more openings extending therethrough where the sidewall has no openings extending therethrough at least along 10% of a height thereof adjacent to the bottom wall to minimize leakage of liquids spilled within the container.

In several approaches, the bottom wall and sidewall are configured such that more than 70% of the container nests within another similarly configured container.

In some approaches, the bottom wall and sidewall are of a rigid plastic material and integral with one another so as to minimize deformation during use.

In several embodiments, a container for use in transporting goods from a distribution center through a supply chain to a customer that includes a bottom wall having upper and lower surfaces, side edges, and end edges; a sidewall having side portions extending upwardly and outwardly from the bottom wall side edges and end portions extending upwardly and outwardly from the bottom wall end edges, the bottom wall and sidewall defining an interior; multiple pairs of slots in the sidewall side portions, each pair of slots having one slot disposed in each of the sidewall side portions that are aligned with one another across the interior; one or more removable divider walls, each divider wall including a main portion sized to extend between the sidewall side portions and panel portions disposed outwardly of the main portion, the removable divider walls configured to mount to the sidewall by being oriented above the pair of slots and shifted downwardly, each slot guiding the corresponding panel portion into a locked position so that the divider wall is restricted from lateral movement, the divider wall selectively dividing the interior into multiple interior portions; and one or more pairs of bag handle holders of the sidewall, each bag handle holder of the pair of bag handle holders configured to receive a handle of a bag so that a bag mounted to the pair of bag handle holders is held in an open configuration within the interior.

In some embodiments, a method of use in transporting goods in a reusable container from a distribution center through a supply chain to a customer is described herein that includes determining contents for a reusable container, the reusable container having an interior defined by a bottom wall and a sidewall; mounting one or more divider walls to the sidewall of the reusable container to selectively divide the interior into multiple portions; loading items disposed in one or more bags into the reusable container by hanging handles of the bags on one or more bag holders of the sidewall; conveying the reusable container through a distribution center on a conveyor; transporting the reusable container to a delivery vehicle; transporting the reusable container via at least the delivery vehicle to a customer; and unloading the one or more bags from the reusable container at a location specified by the customer for delivery.

In several approaches, mounting the one or more divider walls to the sidewall can include orienting the divider wall above a pair of slots disposed in the sidewall of the reusable container and aligned across the interior thereof; and shifting the divider wall downwardly so that outer panel portions thereof are guided by the pair of slots to a locked position with the sidewall.

In some approaches, loading the items disposed in the one or more bags into the reusable container can include disposing the handles of the bags in a pair of bag handle holders disposed in the sidewall such that the bag is held in an open configuration by the pair of bag handle holders.

In several approaches, conveying the reusable container through the distribution center on the conveyor can include engaging pop-up rollers with smooth bottom surface portions of the reusable container; and engaging conveyor belts with patterned bottom surface portions of the reusable container.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A reusable container for use in transporting goods from a distribution center through a supply chain to a customer, the container comprising:
    a bottom wall having upper and lower surfaces, side edges, and end edges;
    a sidewall having side portions extending upwardly from the bottom wall side edges and end portions extending upwardly from the bottom wall end edges, the bottom wall and sidewall defining an interior, wherein the sidewall has an inner surface facing the interior and an outer surface;
    multiple pairs of slots in the sidewall side portions, each pair of slots having one slot disposed in each of the sidewall side portions that are aligned with one another across the interior, each slot including an opening extending through the outer surface of the respective sidewall side portion;
    one or more removable divider walls, each including a main portion sized to extend between the sidewall side portions and outwardly projecting portions configured to extend into the openings of one of the pair of slots through the outer surface of the sidewall to mount the removable divider wall to the sidewall and selectively divide the interior into multiple interior portions; and
    one or more stop portions disposed on the outer surface of the sidewall, each stop portion disposed outwardly of an opening of a slot and provides a stop for an outwardly projection portion of a respective removable divider inserted into the slot.

2. The container of claim 1, wherein the openings of the pair of slots are configured to guide the outwardly projecting portion downwardly as the divider wall is mounted to the sidewall and lock the divider wall against lateral movement.

3. The container of claim 2, wherein the openings of the pair of slots are downwardly tapering with a narrow width bottom portion; and the outwardly projecting portions of the removable divider wall include neck portions and panel portions disposed on the neck portions, where the neck portion is configured to extend through the respective opening and the panel portion is configured to extend adjacent to an outer surface of the respective sidewall side portion such that the sidewall side portion is disposed between the panel portion and the main portion of the removable divider wall at least adjacent to the narrow width bottom portion of the respective opening.

4. The container of claim 1, wherein the one or more pairs of bag handle holders are disposed along an upper edge of the sidewall, the bag handle holders including a notch in the upper edge of the sidewall and arm portions extending over portions of the notch to retain handles of bags within the notch.

5. The container of claim 1, wherein the sidewall further includes one or more bag handle holders which, in combination with the one or more divider walls, are configured to hold bags within the container in a substantially stationary, upright configuration to prevent spillage of loose items.

6. The container of claim 1, wherein a bottom surface of the bottom wall includes solid planar portions extending along a majority of a width thereof between the end edges, the solid planar portions configured to engage pop-up rollers for conveyance.

7. The container of claim 6, wherein the bottom wall includes a patterned portion having a plurality of walls having lowers edges exposed along the bottom wall bottom surface, the patterned portion extending along a majority of the width of the bottom wall between the end edges thereof and configured to engage conveyors for conveyance.

8. The container of claim 1, wherein the bottom wall bottom surface includes upwardly tapering portions extending along the end edges thereof, the upwardly tapering portions configured to enable smooth conveyor transfer.

9. The container of claim 1, wherein the sidewall includes a label area on one or more of the side and end portions thereof, the label area including a smooth portion configured to have a first level of adherence of an adhesive label thereto and a textured edge portion configured to have a second level of adherence of the adhesive label thereto, the first level of adherence being relatively stronger than the second level of adherence.

10. The container of claim 1, wherein the sidewall includes one or more openings extending therethrough, the sidewall having no openings extending therethrough at least along 10% of a height thereof adjacent to the bottom wall to minimize leakage of liquids spilled within the container.

11. The container of claim 1, wherein the bottom wall and sidewall are of a rigid plastic material and integral with one another so as to minimize deformation during use.

12. A container for use in transporting goods from a distribution center through a supply chain to a customer, the container comprising:
    a bottom wall having upper and lower surfaces, side edges, and end edges;
    a sidewall having side portions extending upwardly and outwardly from the bottom wall side edges and end portions extending upwardly and outwardly from the bottom wall end edges, the bottom wall and sidewall defining an interior, the sidewall including one or more pairs of bag handle holders in the sidewall, each of the pair of bag handle holders configured to receive a handle of a bag so that a bag mounted thereto is held in an open configuration within the interior, wherein the sidewall has an inner surface facing the interior and an outer surface;
    multiple pairs of slots in the sidewall side portions, each pair of slots having one slot disposed in each of the sidewall side portions that are aligned with one another across the interior, each slot including an opening extending through the outer surface of the respective sidewall side portion, the multiple pairs of slots including two pairs of slots disposed along the sidewall side portions to divide the interior into thirds and a pair of slots disposed along the sidewall side portions to divide the interior in half; and one or more removable divider walls, each divider wall including a main portion sized to extend between the sidewall side portions and panel portions disposed outwardly of the main portion, the removable divider walls configured to mount to the sidewall by being oriented above the pair of slots and shifted downwardly, each slot guiding the corresponding panel portion into a locked position so that the divider wall is restricted from lateral movement, the divider wall selectively dividing the interior into multiple interior portions, wherein the panel portions extends through the outer surface of the respective sidewall when mounted.

* * * * *

UNITED STATES PATENT AND TRADEMARK OFFICE
CERTIFICATE OF CORRECTION

| | | |
|---|---|---|
| PATENT NO. | : 11,745,916 B2 | |
| APPLICATION NO. | : 16/870694 | |
| DATED | : September 5, 2023 | |
| INVENTOR(S) | : Corey L. Peach et al. | |

It is certified that error appears in the above-identified patent and that said Letters Patent is hereby corrected as shown below:

On the Title Page

On Page 2, in Item (56), under "Other Publications", in Column 2, Line 23, delete "UPSTO;" and insert -- USPTO; --, therefor.

In the Claims

In Column 10, Claim 7, Line 20, delete "lowers edges" and insert -- lower edges --, therefor.

Signed and Sealed this
First Day of October, 2024

Katherine Kelly Vidal
*Director of the United States Patent and Trademark Office*